Oct. 4, 1955   W. S THOMPSON   2,719,323
EXPANSIBLE FILM TENSILIZING APPARATUS
Filed Dec. 12, 1951
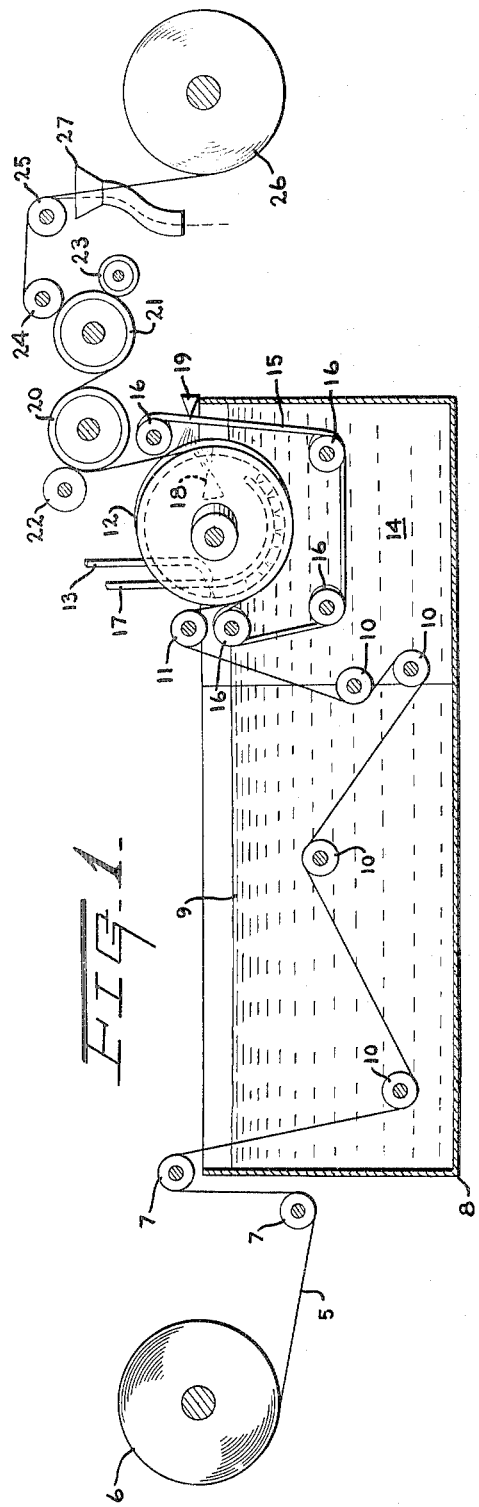
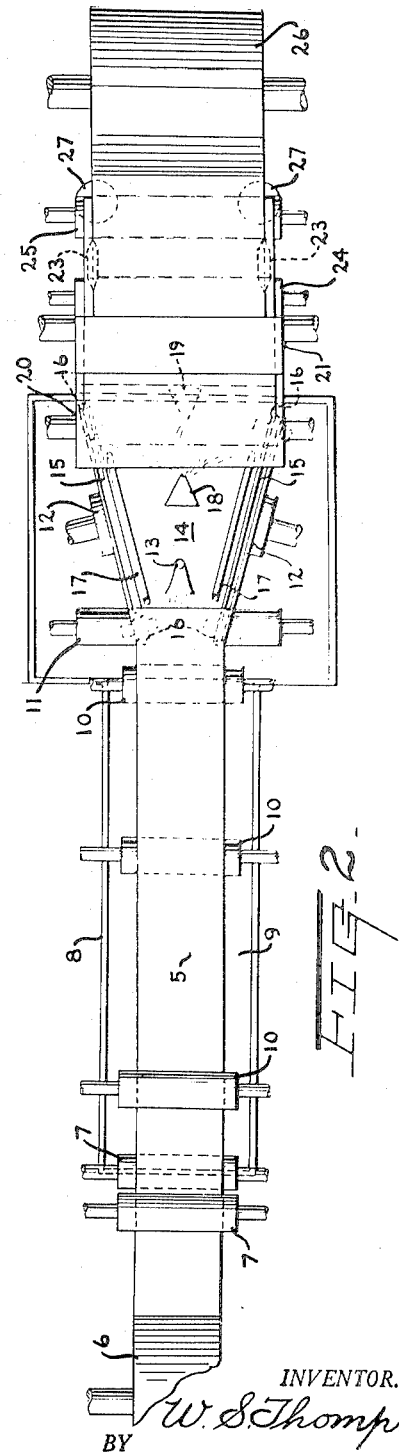
INVENTOR.
W. S. Thompson
BY
Lieber & Lieber
ATTORNEYS.

United States Patent Office 2,719,323
Patented Oct. 4, 1955

2,719,323

EXPANSIBLE FILM TENSILIZING APPARATUS

Walter S. Thompson, East Lansdowne, Pa., assignor to Milprint, Inc., Milwaukee, Wis., a corporation of Delaware Application December 12, 1951, Serial No. 261,290

2 Claims. (Cl. 18—1)

My present invention relates generally to improvements in the art of expanding and tensilizing films or sheets of expansible materials, and relates more particularly to an improved apparatus for continuously tensilizing an advancing web of thermoplastic or like film.

A primary object of the invention is to provide an improved simple and compact apparatus for commercially exploiting the method with utmost efficiency.

As fully set forth in U. S. Patent No. 2,582,165, dated January 8, 1952, to Harry Rosenfeld, for Expansible Tube Tensilizing Apparatus, it has become common practice to utilize stretchable plastic films in the packaging of diverse commodities and in the formation of seamed or seamless tubing for use as protective receptacles of various types and artificial sausage and meat casings. However, while rubber hydrochloride films, known commercially as "Pliofilm," and other thermo-plastic or elastomer materials are known to possess certain desirable qualities including receptiveness to printing and have therefore been extensively used for these purposes with considerable success, such materials are quite expansible and will undesirably stretch out of direct contact with the wrapped or encased articles to provide a loose and untidy final package unless the sheet materials or films are specially treated by a stretching process or the like in the presence of heat. Accordingly, various methods and different types of apparatus have heretofore been proposed for stretching the thermo-plastic material and setting the same in stretched condition in an effort to overcome this objection.

When the thermo-plastic or elastomer films are to be used in fabricating tubing, it has frequently been the practice to first fabricate the tubing and to thereafter either prepare the tubing by stretching the same preparatory to utilization in enclosing the commodity or to perform the stretching and setting operation during the application of the tubing to the product. One method of preparing the tubing prior to the packaging operation is to first cut the tube into the desired lengths and thereafter treat each section individually by placing the same over an expanding mandrel, inserting the mandrel with the tube section into a tank of warm water, expanding the mandrel laterally while thus immersed to cause the tube section to expand, then removing the mandrel and expanded tube section from the warm water and inserting the same in expanded condition into cold water to set the tubing, and finally removing the expanded and set tube section from the mandrel. In the expansion and setting of the tubing simultaneously with the application thereof to the product, substantially the same steps are ordinarily involved with the tubing being first severed into the desired lengths, thereafter subjecting the tube sections independently to a warm liquid, forcing the product into the warm tube section with the aid of a horn or the like to thereby stretch the tube and sometimes additionally stretching the tube sections by twisting the ends thereof, and finally treating the filled tube or casing with cold water to finally set the same.

However, both of these methods are highly objectionable because they are clearly batch methods in which the tube of expansible material is first severed into sections with each section requiring individual subsequent treatment. Consequently, both of these batch methods require slow and costly time consuming hand operations. Furthermore, the tensilization of casings or tube sections expanded by such methods frequently lack uniformity due to the inability to adequately control the degree of stretch or expansion and the temperatures and periods of exposure to the liquids used for expansion and setting purposes, thereby resulting in a rather high percentage of scrap. In addition, these batch methods present a very serious problem in the printing of the tubing since the tubing cannot be satisfactorily printed without considerable resultant distortion before the stretching or tensilizing operation, thereby necessitating the use of a hand fed platen press for printing the individual pretreated tube sections.

While considerable success in overcoming these various objections to the prior batch methods has been obtained through the use of apparatus constructed in accordance with the co-pending Rosenfeld application, Serial No. 154,052, hereinabove referred to, wherein the tubing is laterally stretched and set while in flattened condition in a continuous manner so that the tensilized tubing may be subsequently printed on a rotary press and thereafter cut into sections, the uniformity in the gauge of the material transversely across the entire web and in the width of the finished tube throughout the length thereof is still not always completely satisfactory, and moreover, it still becomes necessary to fabricate the tubing and apply the printing in separate steps. Likewise, the element of completely satisfactory control to obtain uniformity in the gauge of the film across the entire width of the web and uniformity in the width of the finished tube is also lacking in the various other methods and apparatus heretofore proposed for the continuous production of transversely stretched films.

It is therefore a more specific object of the present invention to provide an improved apparatus for continuously producing completely tensilized film in accordance with an improved method which obviates all of the disadvantages attendant prior methods and apparatus.

Another specific object of the invention is to provide an improved continuous web tensilizing apparatus for exploiting the same which enables rapid and economical production of a completely tensilized film of extremely uniform gauge across the entire web.

Another specific object of this invention is to provide an improved apparatus for evenly tensilizing normally expansible film in accordance with a novel method to thereby enable subsequent production of tubing of uniform width and strength.

Another specific object of my invention is to provide an improved expansible film tensilizing apparatus whereby the film may be transversely stretched throughout the length of the web for subsequent printing on a rotary press, the pre-stretched web being capable of ready fabrication into continuous tubular formation simultaneously with the printing thereof and in a single operation.

An additional specific object of my present invention is to provide an improved apparatus for completely and continuously tensilizing normally expansible films which is composed of relatively few parts all of which are readily available for adjustment or repair, and which is moreover capable of economical and efficient operation by a novice with a high degree of control in the operating conditions.

Still another specific object of the present invention is to provide an improved expansible film tensilizing apparatus comprising, means for longitudinally advancing a web of expansible film, means for subjecting the advancing web to a liquid heating medium, means adapted to coact with the opposite edges of the web to laterally spread the web as it advances, means for subjecting the central area of the web to an additional heating medium of higher temperature in the web spreading zone, and means for finally cooling the web while in stretched condition as it advances beyond the spreading zone.

These and other specific objects and advantages of the invention will be apparent from the following detailed description.

A clear conception of the several steps involved in the improved production method, and of a typical apparatus for commercially exploiting the same in the continuous production of tensilized film, may be had by referring to the drawing accompanying and forming a part of this specification wherein like reference characters designate the same or similar parts in the two views.

Fig. 1 is a more-or-less diagrammatic side view of a typical apparatus embodying the invention and depicting the several steps of the improved method, the hot liquid containing tank being shown in section so as to clearly reveal normally concealed structure; and Fig. 2 is a similar diagrammatic top view of the assemblage and also depicting the production steps of the method, but with the squeegee roll omitted for the sake of clarity.

While the invention has been particularly shown and described herein as being especially advantageously applicable to the production of tensilized thermo-plastic films such as "Pliofilm" adapted for subsequent fabrication into tubing for use in encasing certain food products, it is not desired or intended to thereby unnecessarily restrict or limit the invention, since the improved method and apparatus may obviously be advantageously utilized in the tensilization and preparation of other elastomer materials intended for use in diverse forms for packaging other products, and it is also contemplated that certain specific descriptive terms used herein shall be given the broadest possible interpretation consistent with the disclosure.

In accordance with the present improved method of tensilizing normally expansible film, a web of the expansible film is initially continuously longitudinally advanced along a predetermined path. As the web is advanced, the successive portions thereof are subjected to a liquid heating medium, such as by immersion in a hot water bath, for a prolonged period of time. Thereafter, the successive heated portions of the advancing web are laterally stretched or spread a predetermined distance transversely of the opposite side edges while the web is in heated condition and as it is being advanced. Simultaneously with the lateral web stretching operation and in the same zone therewith, the successive heated portions of the advancing web are subjected to an additional liquid heating medium of higher temperature along the central area of the web; and at the same time in this stretching or spreading zone, the successive heated portions of the web are subjected to a liquid cooling medium of lower temperature along the opposite side edges of the web as it advances and is laterally stretched. The laterally expanded web is then advanced beyond the heating and the stretching zones and is subjected to a liquid cooling medium, such as a cold water spray, entirely across the transverse area of the web and on the opposite surfaces thereof. Subsequently, the liquid is removed from the surfaces of the advancing web while the web is subjected to further cooling action; and finally, the laterally stretched or expanded and cooled web is trimmed along the opposite side edges thereof to a uniform width as the web advances, whereupon the completely tensilized web may be rewound for subsequent use.

In the commercial exploitation of the improved method thus described, it has been found preferable to utilize an apparatus substantially like that diagrammatically illustrated in the drawing accompanying this specification. As shown in the drawing, the improved expansible film tensilizing apparatus comprises, in general, means for supporting the web 5 of normally expansible film in the form of a roll 6 from which the web 5 may be continuously or intermittently withdrawn in any suitable manner and longitudinally advanced about suitable guide rollers 7 to an elongated tank 8 containing a controllable bath 9 of hot water or the like providing a liquid heating medium; means comprising a series of spaced guide rollers 10 immersed in the hot bath 9 and providing a definite path along which the web 5 is advanced through the liquid heating medium; another suitable guide roller 11 for guiding the advancing web 5 to lateral spreading or stretching means preferably consisting of a pair of spaced angularly disposed or relatively inclined revolvable disks 12 adapted to coact with the opposite side edges of the web 5 to successively laterally stretch or expand the successive heated portions of the web to a predetermined distance as it advances, the disks 12 being likewise subjected to the same heating medium as the web 5 by partial immersion thereof in the hot bath 9; means such as a liquid supply pipe 13 connected to a suitable source of hot liquid for continuously supplying an additional heating medium of higher temperature than the bath 9 to the central area of the successive heated portions of the advancing web 5 in the spreading zone 14; and means such as hereinafter more fully described for finally cooling the successive portions of the web 5 while in stretched condition as it advances beyond the spreading zone.

To insure positive gripping of the opposite side edges of the advancing web 5 by the spreading disks 12, an endless belt 15 is provided for each of these disks, each belt 15 being supported by a series of suitable pulleys or sheaves 16 for cooperation with the periphery of one of the disks 12 to grip the edge of the web therebetween; and the disks 12 and corresponding sets of pulleys 16 may be rendered angularly adjustable, if desired, so as to vary the amount of lateral stretch imparted to the tube. Also, in addition to the pipe 13 for applying a liquid heating medium of higher temperature to the central area of the advancing web 5 to more advantageously control the stretching so as to produce a uniform thickness or gauge across the web, it is preferable to provide additional means for simultaneously subjecting the side edges of the successive heated portions of the advancing web 5 to a cooling medium in the spreading zone 14; and this may be conveniently accomplished with the aid of a pair of pipes 17 connected to a suitable source of cooling liquid and each having its discharge end located adjacent to the periphery of one of the disks 12 and along the corresponding side edge of the advancing heated web in the spreading zone on opposite sides of the area of higher temperature application, the discharge end of each pipe 17 preferably being curved as shown and provided with a series of discharge orifices so as to effect cooling of the opposite side edges of the web throughout a major portion of the web spreading zone. Immediately after the web 5 has been laterally stretched by the action of the disks 12, the successive stretched portions are cooled across the entire transverse area thereof by a pair of cold water sprays 18, 19 or the like connected to a suitable cold water supply and directed over the opposite surfaces of the stretched web 5 beyond the stretching zone 14; and to further cool and set the stretched web as well as to guide the same in flat condition, it is preferable to provide a pair of chilled rollers 20, 21 over which the web is successively advanced as it leaves the sprays 18, 19, the chilled rollers 20, 21 being likewise cooperable with the opposite surfaces of the web across the entire transverse area thereof. Adjacent to the first cold roller 20 is a rubber squeegee roll 22 which cooperates with the roller 20 to remove the surplus liquid from the surface of the successive portions of the web 5 as the web is advanced between the peripheral surfaces of the roller 20 and roll 22; and operating in cooperation with the second cold roller 21 are a pair of spaced cutting or slitting disks 23 having sharp peripheral edges adapted to trim the opposite unstretched side edges of the web which were gripped between the disks 12 and belts 15 during the stretching operation, thereby insuring the production of a completely tensilized film. While various parts of the apparatus such as the disks 12 and rollers 20, 21 may be driven to aid in advancing the web 5 along its defined path, it is also preferable to provide a driven rubber draw roll 24 peripherally coacting with the tensilized web 5 as it leaves the roller 21 to advance the web about the idler or guide roll 25 to the rewind roll 26; and a pair of suction nozzles 27 may be advantageously placed near the side edges of the advancing web 5 between the slitting wheels 23 and the rewind roll 26 to remove the excess trim, if desired.

From the foregoing detailed description, it is believed apparent that the present invention contemplates provision of an improved film tensilizing production method, and an improved apparatus for the commercial exploitation thereof, which is not only extremely simple and highly efficient in effecting rapid production of completely and uniformly tensilized film in a continuous and economical manner, but which also requires minimum space and fully prepares any desired length of the film for ultimate use. The improved apparatus may be readily adjusted or modified to suit diverse conditions, and the various parts are obviously readily accessible for adjustment or repair. Likewise, the several steps of the production method may be performed under completely controllable conditions by a novice with the aid of the improved apparatus; and the film produced thereby may be subsequently printed by rotary press and formed into bags or casings in one complete operation. As indicated, the web 5 may be stretched to any desired width by controlling the temperatures of the various heating and cooling mediums and by adjusting the relative angularity of the spreading disks 12 and belts 15; and the trimming wheels 23 may likewise be easily adjusted to remove more or less of the edge portion of the web. The improved apparatus has proven highly successful in actual use in the tensilization of "Pliofilm," but other elastomer materials may also be advantageously prepared in like manner with similar apparatus.

It should be understood that it is not desired or intended to limit this invention to the precise details of the apparatus, herein shown and described since various modifications within the scope of the appended claims may occur to persons skilled in the art to which the invention pertains.

I claim:

1. An expansible film tensilizing apparatus comprising, a tank having a bath of hot liquid therein, means for longitudinally withdrawing a web of expansible film from a supply roll, means for initially totally immersing said web in said hot liquid bath as it is withdrawn from said supply roll, means for thereafter removing said web from said hot bath and for directly subjecting the central area only thereof to a liquid spray of higher temperature than that of said hot bath, means adapted to coact with the opposite edges of said heated web to laterally spread the web and again immerse the same in said hot liquid bath simultaneously with the spreading operation, means for cooling the longitudinal edge portions of said web simultaneously with and during the spreading operation, and means for finally withdrawing said web from said hot bath and from said spreading means and for cooling said web transversely across its entire width while in stretched condition.

2. An expansible film tensilizing apparatus comprising, an elongated tank having a bath of hot liquid therein, one end of said tank being somewhat narrower than the other end, means for longitudinally withdrawing a web of expansible film from a supply roll, means for initially totally immersing said web in said hot liquid bath at the narrow end of said tank and for advancing it through said narrow end as it is withdrawn from said supply roll, means for removing said web from said hot bath as it approaches the wider end of said tank and for directly subjecting the central area only thereof to a liquid spray of higher temperature than that of said hot bath, means adapted to coact with the opposite edges of said advancing heated web to laterally spread the web within the wide end of said tank, means for cooling the longitudinal edge portions of said web simultaneously with and during the spreading operation, and means for finally cooling said web transversely across its entire width while in stretched condition and as it leaves the wide end of said tank.

References Cited in the file of this patent

UNITED STATES PATENTS

| 2,339,451 | Bailey et al. | Jan. 18, 1944 |
| 2,377,928 | Fielitz et al. | June 12, 1945 |
| 2,389,655 | Wende | Nov. 27, 1945 |
| 2,483,339 | Gardner et al. | Sept. 27, 1949 |
| 2,582,165 | Rosenfeld | Jan. 8, 1952 |

FOREIGN PATENTS

| 134,245 | Australia | May 14, 1947 |
| 267,756 | Switzerland | July 17, 1950 |